United States Patent
Parkinson et al.

(10) Patent No.: US 8,167,347 B2
(45) Date of Patent: May 1, 2012

(54) THREE PANEL HEAT STAKE STRUCTURE

(75) Inventors: Matthew Frank Parkinson, Ann Arbor, MI (US); Robert Charles Steinbrecher, Dexter, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 311 days.

(21) Appl. No.: 12/546,241

(22) Filed: Aug. 24, 2009

(65) Prior Publication Data
US 2011/0042987 A1  Feb. 24, 2011

(51) Int. Cl.
B60J 7/00 (2006.01)
(52) U.S. Cl. .................. 296/1.08; 296/146.7
(58) Field of Classification Search .............. 296/146.7, 296/1.08; 264/249
See application file for complete search history.

(56) References Cited

U.S. PATENT DOCUMENTS

| | | |
|---|---|---|
| 5,368,802 A | 11/1994 | Wanha |
| 5,924,198 A | 7/1999 | Swanson et al. |
| 2003/0165664 A1 * | 9/2003 | Carroll et al. ................. 428/138 |
| 2004/0169396 A1 * | 9/2004 | Dooley et al. ............. 296/146.7 |

* cited by examiner

*Primary Examiner* — Joseph Pape
(74) *Attorney, Agent, or Firm* — Gifford, Krass, Sprinkle, Anderson & Citkowski, P.C.

(57) ABSTRACT

A trim panel assembly which provides support for the interior panels during a heat staking process, even when the interior panels overlap an outer panel, is provided. The trim panel assembly includes a first support boss extending from an inner surface and an outer surface which is adjacent a weld horn backing plate during the heat staking process. A second panel includes an outwardly extending elongated stud extending from an inner surface, and a support boss extending from an outer surface. An accessory panel having an aperture is aligned with the second panel such that the elongated stud passes through the aperture. During the heat staking process pressure is applied to the stud of the second panel which is supported by the weld horn backing plate through the contact between the support boss of the first panel and the boss of the second panel.

16 Claims, 2 Drawing Sheets

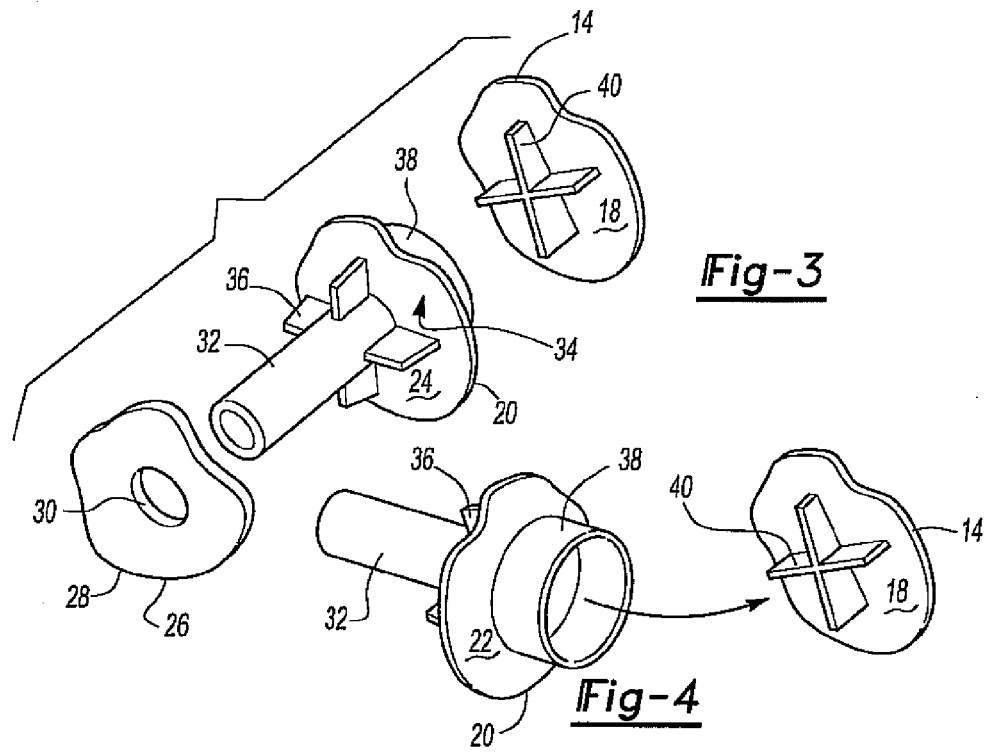
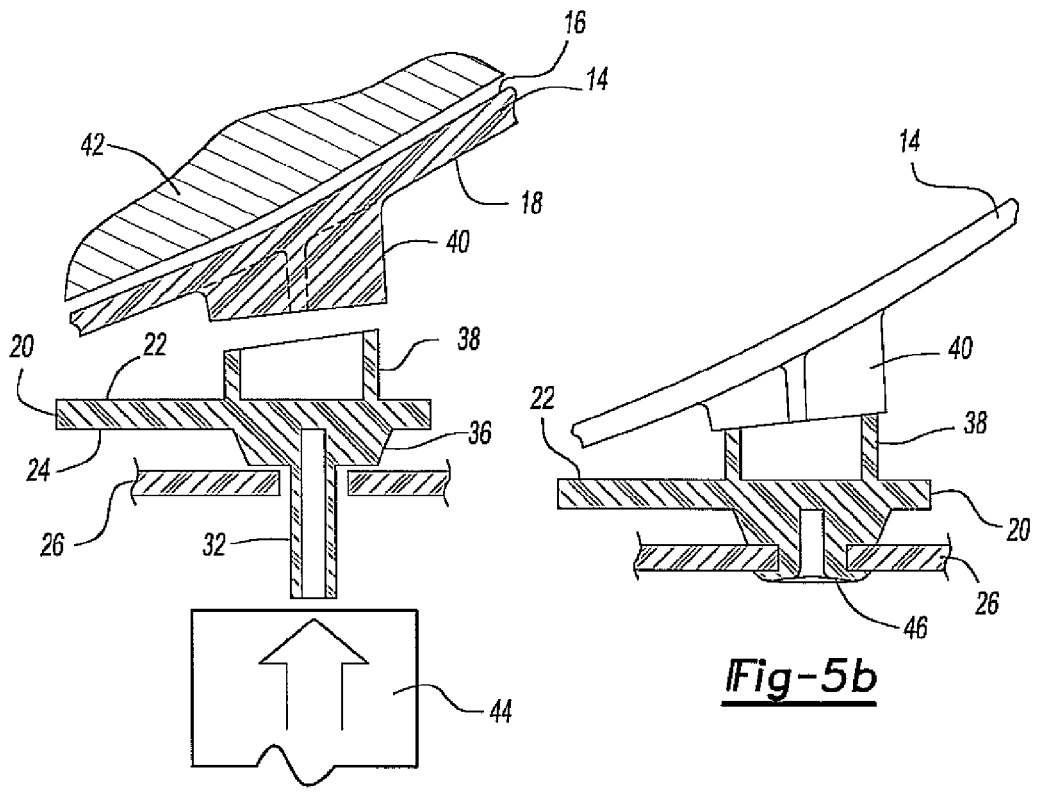

THREE PANEL HEAT STAKE STRUCTURE

FIELD OF THE INVENTION

The present invention relates to a trim panel assembly for a door of an automotive vehicle having multiple trim panels. More particularly, the present invention relates to the structure of the trim panels which provide support during the heat staking process.

BACKGROUND OF THE INVENTION

It is well known in the art to attach the individual trim panels of a trim panel assembly by a process known as staking. In such a process, one of the parts to be joined has an aperture while the other part includes an elongated protrusion sized to fit through the aperture. Pressure is then applied to compress the protrusion radially forming an interference fit between the two parts.

As the individual trim panels of a trim panel assembly are often formed of a molded plastic, a variation of the staking process known as thermoplastic or heat staking is used. The heat staking process uses heat to soften the plastic protrusion and pressure to compress the protrusion forming a head which mechanically locks the two panels together.

As such, heat staking is a versatile process allowing the simultaneous formation of several heads by deforming several protrusions. Trim panel assemblies which are composed of several individual trim panels are particularly well suited to the heat staking process as the multitude of protrusions of the individual panels can be simultaneously deformed thereby assembling the trim panel assembly in one step. However, trim panel assemblies often include overlapping trim panels which may or may not require all of the overlapping panels to be attached. In many instances the trim panel assembly only requires that the outer two overlapping panels be attached even though there is a third overlapping panel.

As the heat staking process utilizes a weld horn to apply heat and then pressure to compress the softened protrusion, a weld horn backing plate is placed behind the panels to provide rigid support during the heat staking process. However, if only the two outer panels are to be attached and there is a third overlapping panel, it is the third overlapping panel which would contact the weld horn backing plate. As such, the two outer panels to be attached are left unsupported.

In such a circumstance it is known in the art to provide a support extending from the third overlapping panel which abuts one of the panels to be attached thereby providing support. However, a problem arises when the distance between the third overlapping panel and one of the panels to be attached extends beyond a certain point. As the individual trim panels are formed of a molded plastic, extending the support to such a point will cause surface defects on the opposite side of the trim panel. This is unacceptable as the opposite surface of the third overlapping panel faces the interior passenger compartment of the automotive vehicle.

Thus, there exists a need for an improved trim panel assembly having a structure capable of providing support during a heat staking process.

SUMMARY OF THE INVENTION

The present invention provides an improved trim panel assembly which overcomes the above-mentioned disadvantages of the previously known trim panel assemblies which lack sufficient structural support for the heat staking process.

In brief, a trim panel assembly which provides support during the heat staking attachment of an accessory panel between a weld horn and a weld horn backing plate is provided. The trim panel assembly includes a first panel having an outer surface and an inner surface, the outer surface having an outwardly extending support boss and the inner surface being adjacent to the weld horn backing plate. A second panel has an outer surface which has an elongated stub aligned with an aperture formed on the accessory panel such that the stub extends through the aperture. An inner surface of the second panel includes an outwardly extending boss which contacts the support boss of the first panel.

By providing support bosses on the first and the second panels, rather than having a boss extend from the first panel to contact the inner surface of the second panel the height of the support boss extending from the first panel is reduced. As such, support for the second panel during the heat staking process is provided while avoiding the formation of surface defects on the inner surface of the first panel.

It is appreciated, that the inventive trim panel assembly is not limited to use in automotive vehicle doors, and can be utilized in any field or environment in which two interior panels are to be attached by a staking process, and a third panel is positioned between the interior panels a rigid supports such as a weld horn backing plate.

BRIEF DESCRIPTION OF THE DRAWINGS

A better understanding of the present invention will be had upon reference to the following detailed description when read in conjunction with the accompanying drawings, wherein like reference characters refer to like parts throughout the several views and in which:

FIG. 3 is a partial exploded view illustrating the support structure of the trim panel assembly;

FIG. 4 is a partial exploded view illustrating the interaction of the first trim panel and the second trim panel;

FIG. 5A is a partial cross-sectional view taken along the line 5-5 in FIG. 2 illustrating the interaction between the support structure prior to the heat staking process; and FIG. 5B is a partial cross-sectional view taken along the line 5-5 in FIG. 2 illustrating the interaction of the support structure are the heat staking process.

DETAILED DESCRIPTION OF A PREFERRED EMBODIMENT OF THE PRESENT INVENTION

The present invention has utility as a trim panel assembly which provides support for the inner panels during the heat staking process even when the inner panels are overlapped by an outer panel. By providing the first panel and the second panel with corresponding supporting bosses, the second panel can be supported while avoiding the formation of surface defects on the outer surface of the first panel.

Figure 1:
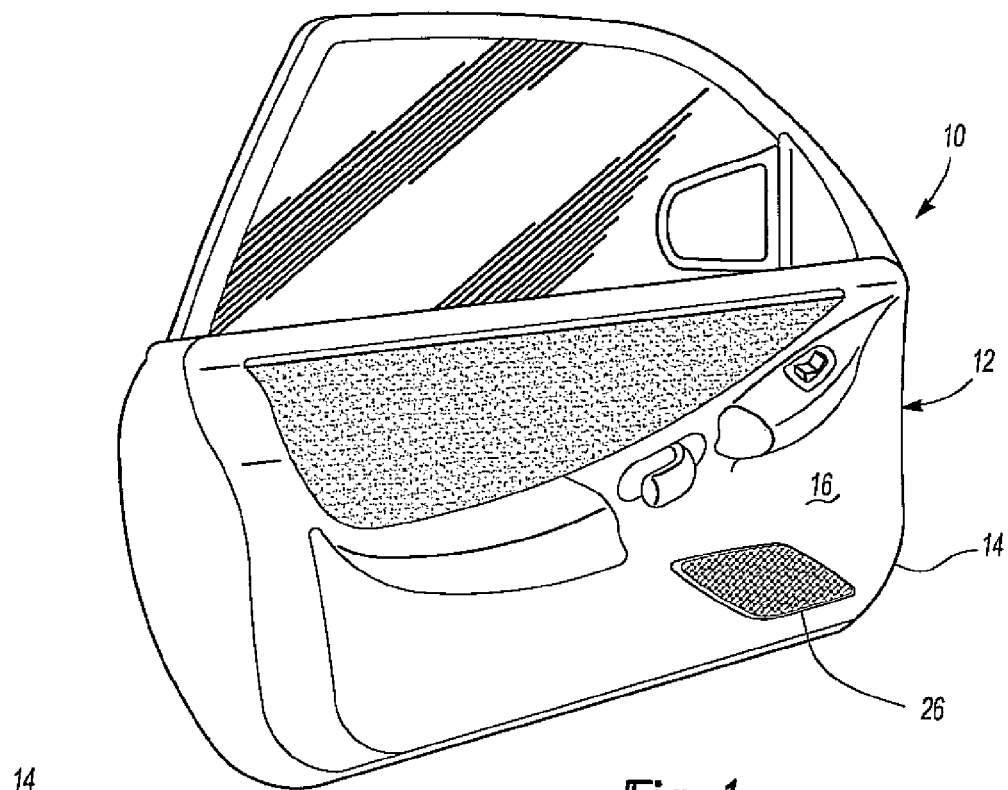
FIG. 1 is a front perspective view illustrating a door of an automotive vehicle having the inventive trim panel assembly.

With reference to FIG. 1, a door of an automotive vehicle is generally illustrated at 10. A trim panel assembly 12 attaches to the door frame to cover the various door-related mechanisms including door handles, window controls, electronic locking systems, and audio speaker assemblies. The trim panel assembly 12 includes an outer trim panel 14 having an outer surface 16 which faces the interior passenger compartment of the automotive vehicle. As such, the outer surface 16 includes a stylized surface so as to provide an aesthetically pleasing appearance to the interior of the automotive vehicle.

Figure 2:
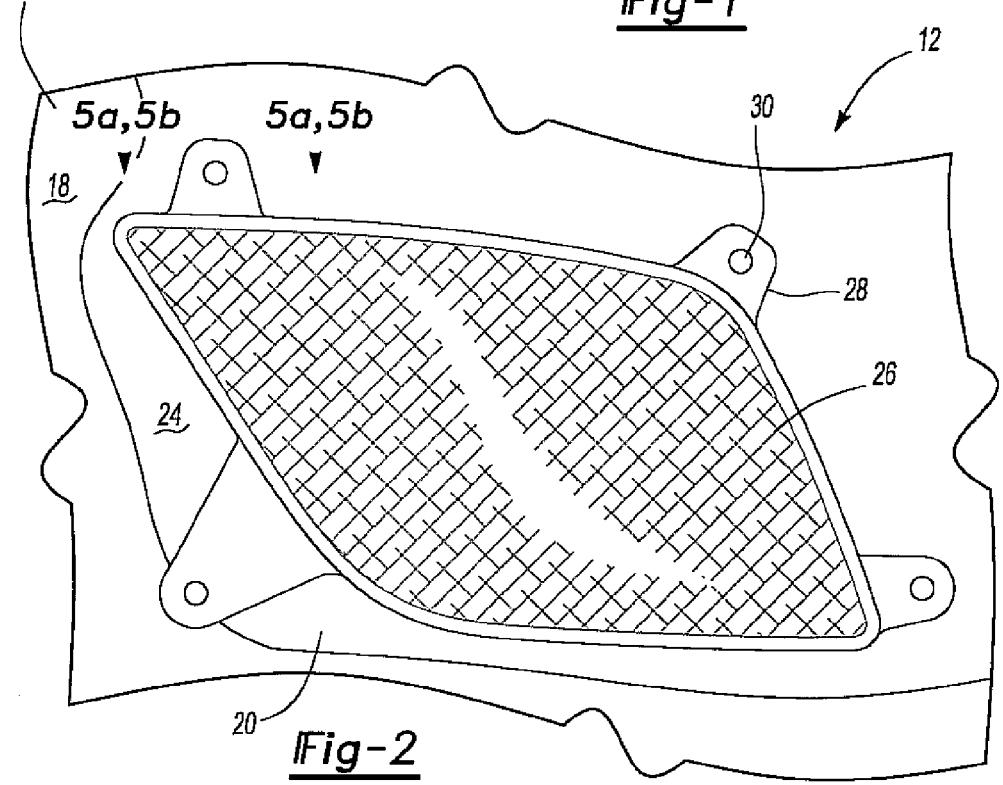
FIG. 2 is a partial rear view illustrating the interior of the trim panel assembly.

An interior panel 20 overlaps an inner surface 18 of the outer panel 14, as clearly seen in FIG. 2. The interior panel 20 includes an outer surface 22 which faces the inner surface 18 of the outer panel 14 and an inner surface 24 which faces the frame of the door 10. An accessory panel 26, which in the illustrated embodiment is a speaker grate covering the speaker opening of the speaker assembly, overlaps the interior panel 20. It is appreciated, of course, that the accessory panel is not limited to a speaker grill, and may be any other type of panel having an aperture which is to be attached to the interior panel 20.

The accessory panel 26 includes a number of attachment tabs 28 used to attach the interior panel 20 to the accessory panel 26. With reference to FIG. 3, the tabs 28 of the supplementary panel 26 include an aperture 30. The aperture 30 is aligned relative to the interior panel 20 such that a deformable stud 32 extending from the inner surface 24 of the interior panel 20 passes therethrough so as to facilitate the heat staking process. The stud 32 includes a base 34 having a plurality of radially extending ribs 36 to accurately space the interior panel 20 a predetermined distance from the accessory panel 26.

A boss 38 extends from the outer surface 22 of the interior panel 20 so as to contact a support boss 40 extending from the inner surface 18 of the outer panel 14. In this manner the distance the support boss 40 is required to span is reduced by the distance the boss 38 extends from the outer surface of the interior panel 20. As such, the interior panel 20 can be supported by the outer panel 14 even if the distance between the interior panel 20 and the outer panel 14 would normally cause a surface defect on the outer surface 16.

In a preferred embodiment, the boss 38 has a circular cross section and the support boss 40 has a generally X-shaped cross section so as to provide sufficient contact points between the boss 38 and support boss 40. It is appreciated, of course, that the cross sections of the boss 38 and the support boss 40 may be reversed or that each of the bosses have other cross-sectional shapes illustratively including triangular, rectangular, or any other suitable cross section so as to provide sufficient contact points between boss 38 and support boss 40.

The relative position and interaction of the various trim panels during the heat staking process will now be discussed. With reference to FIG. 5A, the outer panel 14 is placed adjacent to a weld horn backing plate such that the outer surface 16 contacts the weld horn backing plate 42. The interior panel 20 is placed adjacent to the outer panel 14 such that the boss 38 is aligned with the support boss 40, and that the stud 32 extends through the aperture 30 of the accessory plate 26. A welding horn 44 applies heat to soften the stud 32 and then applies pressure in the longitudinal direction of the stud to mechanically attach the interior panel 20 to the accessory panel 26.

Referring now to FIG. 5B, the pressure applied by the welding horn 44 deforms the stud 32 into a head cover 46 which extends radially beyond the width of aperture 30 thereby mechanically attaching the interior panel 20 to the accessory panel 26. As the welding horn 44 applies pressure to the stud 32, the boss 38 of the interior panel 20 contacts the support boss 40 of the outer panel 14 which abuts the welding horn backing plate 42 to support the interior panel 20. As such, the outer panel 14 is sandwiched between the interior panel 20 and the weld horn backing plate 42 which allows the welding horn 44 to apply pressure to the stud 32 and consequently the interior panel 20 due to the contact between the support boss 40 and the boss 38.

It will be appreciated, of course, that the present invention is not limited to use with a door trim panel or in conjunction with a motor vehicle. The inventive trim panel assembly is capable of providing support during a staking process for any sort or type of panels regardless of location.

From the foregoing, it can be seen that the present invention provides a trim panel assembly having a support structure which allows the interior panels to be supported during a heat staking process even when overlapped by an outer panel. Having described the invention, however, many modifications thereto will become apparent to those of ordinary skill in the art to which it pertains without deviation from the spirit of the invention as defined by the scope of the appended claims.

It is claimed:

1. A trim panel assembly at least partially attached during a welding process, said trim panel assembly comprising:
    an accessory panel having an aperture;
    a first panel having an outer surface and an inner surface, said inner surface of said first panel having an outwardly extending support boss; and
    a second panel positioned between said first panel and said accessory panel, said second panel having an outer surface and an inner surface, said inner surface of said second panel having an elongated stud aligned with said aperture of said accessory panel such that said stud extends through said aperture, said stud adapted for welding to attach said second panel to said accessory panel, said outer surface of said second panel having an outwardly extending boss that contacts said support boss of said first panel to brace said second panel against deflection during the welding process.

2. The trim panel assembly of claim 1, wherein said stud is deformable, and wherein during the welding process said accessory panel, said first panel and said second panel are compressed between a weld horn and a weld horn backing plate, said inner surface of said first panel being positioned against the weld horn backing plate, and wherein the weld horn applies pressure to said stud such that a portion of said stud deforms and extends radially beyond said aperture creating a head thereby mechanically attaching said accessory panel to said second panel.

3. The trim panel assembly of claim 2, wherein during the deformation of said stud said second panel is supported by the weld horn backing plate due to the contact of said support boss of said first panel and said boss of said second panel.

4. The trim panel assembly of claim 1, wherein one of said support boss of said first panel or said boss of said second panel has a circular cross section.

5. The trim panel assembly of claim 4, wherein the other of said support boss of said first panel or said boss of said second panel has a generally X-shaped cross section.

6. The trim panel assembly of claim 1, wherein said outer surface of said first panel faces a passenger compartment of an automobile.

7. The trim panel assembly of claim 1, wherein said stud has a base to space said accessory panel a predetermined distance from said second panel.

8. The trim panel assembly of claim 7, wherein said base is a plurality of ribs extending radially from said deformable stud.

9. The trim panel assembly of claim 1, wherein said support boss of said first panel, said boss and said stud of said second panel extend, and said aperture of said accessory panel extend along a common axis.

10. A method of forming a trim panel assembly, said method comprising the steps of:

provided an accessory panel having an aperture;

providing a first panel having an outer surface and an inner surface, said inner surface having an outwardly extending support boss;

providing a second panel positioned between said first panel and said accessory panel, said second panel having an outer surface and an inner surface, said inner surface of said second panel having an elongated stud that extends through said aperture of said accessory panel, said outer surface of said second panel having an outwardly extending boss that abuts said support boss;

welding said accessory panel to said second panel by deforming at least a portion of said stud to create a head that extends radially beyond said aperture.

11. The method of claim 10, wherein said stud is deformed by a weld horn that applies pressure to said stud, and wherein a weld horn backing plate is positioned against said outer surface of said first panel and said abutment of said support boss and said boss braces said second panel against deflection during said welding.

12. The method of claim 11, wherein one of said support boss of said first panel or said boss of said second panel has a circular cross section.

13. The method of claim 12, wherein the other of said support boss of said first panel and said boss of said second panel has a generally X-shaped cross section.

14. The method of claim 13, wherein said exterior surface of said first panel faces a passenger compartment of an automobile.

15. The method of claim 14, wherein said stud has a base to space said accessory panel a predetermined distance away from said second panel.

16. The method of claim 15, wherein said base of said stud is a plurality of ribs extending radially from said stud.

* * * * *

UNITED STATES PATENT AND TRADEMARK OFFICE
CERTIFICATE OF CORRECTION

PATENT NO.         : 8,167,347 B2                          Page 1 of 1
APPLICATION NO.    : 12/546241
DATED              : May 1, 2012
INVENTOR(S)        : Matthew Frank Parkinson et al.

It is certified that error appears in the above-identified patent and that said Letters Patent is hereby corrected as shown below:

In the Specification

At column 2, line number 48, Delete "are", Insert --after--.

Signed and Sealed this
Twenty-fourth Day of June, 2014

Michelle K. Lee
*Deputy Director of the United States Patent and Trademark Office*